United States Patent [19]

Hoyt

[11] 4,331,618
[45] May 25, 1982

[54] TREATMENT OF FUEL PELLETS

[75] Inventor: Richard C. Hoyt, Kennewick, Wash.

[73] Assignee: Rockwell International Corporation, El Segundo, Calif.

[21] Appl. No.: 155,829

[22] Filed: Jun. 2, 1980

[51] Int. Cl.³ .............................................. G21C 19/48
[52] U.S. Cl. .................... 264/0.5; 252/627; 423/252; 423/261
[58] Field of Search ................. 264/0.5; 252/301.1 W; 423/261, 252

[56] References Cited

U.S. PATENT DOCUMENTS

| 4,134,941 | 1/1979 | Hrovat et al. | ............... 252/301.1 W |
| 4,225,560 | 9/1980 | Nakanishi et al. | ................... 423/261 |

FOREIGN PATENT DOCUMENTS 1297158  11/1972  United Kingdom ................. 423/261

OTHER PUBLICATIONS

Vaughen, "Separation of Silicon Carbide Coated Fertile and Fissle Particles . . . ", Chem. Abs., vol. 86, (1977), #112671b.

Hartmann, "Development of a Dry-Mechanical Procedure For Separating a Mixture . . . ", Chem. Abs., vol. 91, (1979), #183571h.

*Primary Examiner*—Deborah L. Kyle
*Attorney, Agent, or Firm*—Henry Kolin; Clark E. DeLarvin

[57] ABSTRACT

A method of treating a nuclear reactor fuel pellet which has been irradiated and is at least partially depleted of its initial fissile material content to substantially reduce the amount of fuel which would have to be reprocessed before it could be reused. The pellet is pulverized to a median particle size of less than about 300 microns and thereafter is separated into two fractions by size. In accordance with the present invention, it has been found that one of said fractions will contain a significantly greater proportion of the fissile content of the pellet than the other of said fractions. The fissile-rich fraction is suitable for reforming into pellets for use in a nuclear reactor with little or no further enrichment required. The method of the present invention is applicable to the metallic, oxide, and carboxide forms of nuclear reactor fuels such as uranium and thorium, which have been in service in a light water reactor or a fast breeder reactor.

6 Claims, No Drawings

TREATMENT OF FUEL PELLETS

FIELD OF THE INVENTION

The present invention relates to the treatment of irradiated nuclear fuel pellets. It particularly relates to the treatment of fuel pellets which have been in service in a nuclear reactor and are at least partially depleted of their initial fissile content.

BACKGROUND ART

There are numerous types of nuclear power fuel elements. The present invention is particularly applicable to those nuclear fuel elements of the solid type which comprise a body or core of thermal neutron fissionable uranium, thorium, or mixtures thereof which may be present in an elemental state or alloyed with zirconium, niobium, or other low-cross-section, corrosion-resistant material such as stainless steel, zirconium, or zirconium alloys.

Nuclear power fuel elements generally contain two types of nuclear fuel material, both of which are valuable. It is essential that the fuel element contain a fissionable nuclear fuel material such as uranium isotopes U-233 or U-235. Fuel elements also contain nuclear fuel materials that are not originally fissionable but which can be converted to fissionable material and are, therefore, said to be fertile or potential nuclear fuel materials. For example, U-238 is a fertile material often present in fuel elements in considerable amounts. In some instances, as much as 99.3% of the uranium content may be present in the form of U-238 in the case of an unenriched element. During the course of the use of the element in a power reactor, the fissionable material, such as U-233 and U-235, releases neutrons. Some of the neutrons are trapped by the fertile but unfissionable U-238 present in the element, and the U-238 eventually becomes Pu-239 which is fissionable. In the same way, thorium, which is a fertile but unfissionable material, absorbs neutrons to become U-233 which is fissionable and useful as a nuclear fuel material. The fuel material may be in the form of a metal, an oxide, or a carbide.

Fuel elements of the solid type, with which the present invention is particularly applicable, deteriorate due to radiation damage long before the useful content of the fissionable material is used. At the same time, radioactive fission products accumulate in the fuel element. Some are gases and other are solid; however, each is objectionable in reducing the efficiency of the reactor as a whole and each exerts some part in the deterioration or reduction of the useful life of the fuel element. More particularly, many of the fission products have a high neutron capture cross section in a thermal neutron flux, thus reducing the total amounts of neutrons available for production of thermal energy or conversion of fertile material to fissile material. In addition, the gaseous fission products build up pressure within the cladding material which can result in permanent structural damage to the elements and possibly to the reactor. Since these deleterious effects occur at a time when only a fraction of the fissile values have been burned by the fission process and since the unburned fuel is too valuable to be wasted, it advantageously is reprocessed to render it fit for reuse.

None of the heretofore known methods for recovering fuel and fertile uranium or thorium from such elements has been completely satisfactory.

One method for recovering unburned fissile and fertile fuel values from solid neutron irradiated fuel elements involves dissolution of the cladding and the fuel, followed by a liquid-liquid solvent extraction process in which an aqueous nitrate feed solution containing said values is selectively extracted by contact with an organic aqueous immiscible extractant. An example of solvent extraction process for recovering uranium values, for example, is found in U.S. Pat. No. 2,848,300.

A major disadvantage of aqueous dissolution of cladding, however, is that large aqueous feed volumes containing dissolved metals must be carried through the solvent extraction process. This, in turn, leads to a large radioactive waste volume requiring expensive waste storage and handling. In addition, the solutions generally are highly corrosive and have a high fission product decay heat content. Removal of heat from aqueous waste and formation of a stable solid monolith which isolates the waste from the biosphere requires expensive processing, transportation, and disposal.

In an attempt to reduce the volume of high-level radioactive waste pollution, various other methods have been proposed, such as separately dissolving the cladding material in concentrated sulfuric acid, thus making the fuel core available for ready dissolution in a nitric acid solution. However, a cladding material, such as stainless steel, is relatively passive in sulfuric acid and, even when it does react, there is a high probability that cross contamination between the decladding solution and the core solution will result, thus further complicating the problem of recovering the fuel.

U.S. Pat. No. 2,827,405 suggests a method of desheathing fuel rods of uranium metal bars by puncturing the sheath to expose the uranium core at a plurality of points. The rod then is reacted with steam at an elevated temperature to oxidize the uranium and break the bond between the sheath and the uranium. The fuel is recovered as an oxide requiring expensive processing to convert it back to a metal.

Another method suggested in U.S. Pat. No. 2,962,371 comprises reacting the element at an elevated temperature with essentially pure anhydrous hydrogen for a time sufficient to hydride the cladding so that it falls from the core. This invention, however, is concerned with zirconium-clad fuel elements, although it is suggested that it is also applicable to elements that are clad in alloys of zirconium.

Another process for recovering the core of a zirconium-clad fuel element is disclosed in U.S. Pat. No. 3,007,769. The process comprises immersing the clad element in a substantially neutral solution of ammonium fluoride to effect the dissolution of the zirconium and separate the neutron fissionable material values from the solution.

U.S. Pat. No. 3,089,751 suggests a process for the selective separation of uranium from ferritic stainless steels. In accordance with the process disclosed therein, a nuclear fuel element consisting of a core of uranium clad in a ferritic stainless steel is heated to a temperature in the range of 850° C. to 1050° C. for a period of time sufficient to render the cladding susceptible to intergranular corrosion. The heated element is then cooled rapidly to a temperature range of 850° C. to 615° C. and then to about room temperature. The cooled element then is contacted with an aqueous nitrate solution to selectively and quantitatively dissolve the uranium from the core.

Gas phase processes for effecting the dissolution of fuel or the cladding material are disclosed in U.S. Pat. Nos. 3,149,909; 3,156,526 and 3,343,924. The problem of handling and containing gaseous fuel, however, is even greater than that for liquid phase processes.

U.S. Pat. No. 3,929,961 suggests a method of treating a nuclear fuel element enclosed in a stainless steel metal sheath which comprises disposing the fuel element with a portion thereof in an induction coil, subjecting the induction coil to a radio frequency magnetic field to induce local induction heating of the metal sheath sufficient to raise the temperature of the portion of the sheath within the coil to its melting temperature and effect local melting therein. The fuel element is moved axially relative to the induction coil within continued heating to rupture the metal sheath. The fuel values are subsequently recovered by dissolution.

It is a common disadvantage of the prior art processes that they require that all of the fuel be enriched prior to reuse or at some point require liquid or gas phase processing to enhance their fissile content with all of the problems associated therewith.

SUMMARY OF THE INVENTION

In accordance with the present invention, there is provided a method for substantially reducing the amount of nuclear reactor fuel which must be reprocessed before it can be reused. In accordance with the present invention, an irradiated and at least partially depleted fuel which has been in service in a nuclear reactor is pulverized to a particle size of less than about 300 microns and preferably a median particle size of less than about 100 microns. It has been found that when such a fuel is pulverized and segregated by size into two fractions, one of said fractions will contain higher fissile content than the other. Thus, the fissile-rich fraction can be reformed into the fuel pellets for reuse in a reactor with little or no further enrichment required. Indeed, when the fuel is obtained from a fast breeder reactor, it is possible to obtain a fissile-rich fraction sufficiently rich in fissile material for reuse without any further enrichment.

DESCRIPTION OF THE PREFERRED EMBODIMENT

In accordance with the present invention for the treatment of a nuclear fuel pellet, the pellet is first pulverized. The precise manner in which pulverization is achieved is not particularly critical, thus the pellet may be pulverized utilizing conventional mechanical means such as a ball mill or the like. Alternatively, the pellet can be pulverized chemically. Obviously, of course, a combination of these techniques may be used. The manner in which chemical pulverization is obtained will depend, of course, upon the particular type of fuel being used. Thus, if the fuel is in a metallic or elemental form, it advantageously is hydrided and subsequently dehydrided to reduce it back to its elemental state. Repetitions of this cycle result in the metal being converted into a friable, granular form. Generally, the hydriding is accomplished with pressure from about 0.5 to 2 atmospheres and a temperature from about 400° to 650° C. The dehydriding then is accomplished by increasing the temperature to about 700° to 900° C. to decompose the hydride to elemental metal and release the hydrogen which is withdrawn.

When the fuel is in the form of an oxide such as $UO_2$, pulverization is accomplished by oxidizing the $UO_2$ to $U_3O_8$ by exposing the fuel to oxygen at a temperature from about 300° to 500° C. Thereafter, the $U_3O_8$ is reduced back to the $UO_2$ form by exposing it to a reducing environment such as hydrogen at a temperature of from about 600° to 900° C. and preferably from about 700° to 800° C. Again frequent cycling from the lower oxide to the higher oxide state results in disintegration of the fuel into small friable discrete particles.

Obviously, the precise manner in which the pellet is pulverized is not critical to the present invention, provided it be sufficiently pulverized to provide a median particle size of about 300 microns and preferable a median particle size of less than about 100 microns.

The essence of the present invention resides in the fact that during the operation of, for example, a light water reactor fuel, restructuring occurs during radiation causing columnar grain growth near the central portion of the element. This restructed fuel pulverizes substantially less rapidly than the unrestructured portion of the fuel element near the surface, particularly during chemical pulverization. Most of the plutonium formed during irradiation of the fuel in a light water reactor occurs or is produced in this unrestructured portion. The plutonium so formed constitutes a significant portion of the fissile content of the fuel element. Thus, it is possible to take advantage of the discovery that pulverization of irradiated fuel occurs predominantly by fracture along the grain boundaries to yield particles composed of clusters of grains and results in the smallest particles having originated from the outer plutonium-rich region of the fuel pellet for light water reactors. Specifically, since the pulverized particle will have different sizes with different fission product and actinide compositions, it is possible by size classification to separate the pulverized fuel into two fractions, one of which will be substantially richer in fissile material than the other. The fissile-rich fraction can be returned and formed into additional fuel pellets with substantially less enrichment required. Indeed, in accordance with the present invention, when approximately 20% to 40% by weight and preferably 30% to 35% (for fuels with a burnup of 30,000 to 50,000 megawatt days per metric ton) of the outer surface of a light water reactor fuel pellet is recycled, fuel costs are reduced in excess of about 6% and the uranium reserves are extended 13% as compared to a once-through fuel cycle.

In a liquid metal cooled fast breeder reactor (FBR), the situation is reversed. More particularly, like the light water reactor, the fuel restructuring during irradiation causes columnar grain growth near the central portion of the pellet, which restructured fuel pulverizes less rapidly than unrestructured fuel near the pellet surface. However, in an FBR, the formation of plutonium occurs (as a result of fast neutron flux) substantially uniformly throughout the pellet. During restructuring of stoichiometric FBR fuel, the large thermal gradient between the surface and core of the pellet causes the plutonium to migrate towards the central portion of the pellet, and most fission products (which are undesirable because of their high neutron capture cross section) tend to concentrate or migrate toward the pellet surface where restructuring does not occur. Thus, following pulverization, size classification of the spent fuel will produce a fine powder which is relatively low in plutonium but rich in the fission products and a course particle product which is rich in plutonium but low in the undesirable fission products.

During normal burnups in FBR driver cores, about one-fourth to one-third of the fuel is restructured. Portions of the restructured fuel may have a plutonium content of from about 1 to 2% greater than that of the original fuel. Thus, up to one-third of the fast breeder reactor spent driver core processed according to the present invention can be recycled directly as enriched material for the fabrication of new driver core assemblies. In addition, in most fast breeder reactors, different zones in the core have different fissile enrichment requirements. By recycling dry processed spent fuel from high enrichment zones of the driver core to lower enrichment zones in subsequent cycles, the amount of spent driver fuel requiring further processing for enrichment can be reduced to about one-half of the spent driver fuel. Thus, by practicing proper fuel management, as little as 15 to 20% of the total spent driver and blanket fuel needs to be treated by the more conventional chemical processing techniques of the prior art.

While the example illustrating this invention has been described with respect to certain temperatures and other reactive conditions, and what is now considered to represent the best embodiment has been illustrated and described, the invention may be otherwise practiced within the scope of the teachings set forth, as will be readily apparent to those skilled in the art. Accordingly, this invention is not to be limited by the illustrative and specific embodiments thereof, but the scope should be determined in accordance with the following claims.

I claim:

1. A method of treating irradiated fuel pellets containing a fissile material selected from the group consisting of uranium and thorium comprising:
   pulverizing said pellets to a median particle size of less than about 300 microns;
   separating the pulverized particles into two fractions by size, one of said fractions containing a higher amount of fissile material than the other, the differences in particle size and fissile content of the fractions being a result of said fuel pellets having been irradiated; and
   forming new fuel pellets out of that fraction having a higher amount of fissile material.

2. The method of claim 1 wherein said pellets are pulverized to provide a median particle size of less than about 100 microns.

3. The method of claim 1 wherein said pellets are obtained from a liquid metal fast breeder reactor and the fissile-rich fraction is suitable for forming additional fuel pellets for use in a breeder reactor without need of further enrichment.

4. The method of claim 1 wherein said fuel pellets comprise irradiated uranium oxide.

5. The method of claim 1 wherein said fuel pellets are uranium oxide and are pulverized by repeatedly oxidizing them to $U_3O_8$ and subsequently reducing them back to $UO_2$.

6. The method of claim 1 wherein said fuel pellets are metallic and are pulverized by repeatedly hydriding and dehydriding them.

* * * * *